US009641473B2

(12) United States Patent
Shibao

(10) Patent No.: US 9,641,473 B2
(45) Date of Patent: May 2, 2017

(54) DATA COMMUNICATION APPARATUS, DATA COMMUNICATION APPARATUS CONTROL METHOD, AND PROGRAM

(75) Inventor: Koki Shibao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 13/316,384

(22) Filed: Dec. 9, 2011

(65) Prior Publication Data

US 2012/0158873 A1    Jun. 21, 2012

(30) Foreign Application Priority Data

Dec. 21, 2010 (JP) ................................ 2010-285155

(51) Int. Cl.
| G06F 15/16 | (2006.01) |
| H04L 12/58 | (2006.01) |
| H04N 1/00 | (2006.01) |
| H04N 1/32 | (2006.01) |

(52) U.S. Cl.
CPC ......... *H04L 51/22* (2013.01); *H04N 1/00217* (2013.01); *H04N 1/00244* (2013.01); *H04L 51/14* (2013.01); *H04L 51/18* (2013.01); *H04N 1/32432* (2013.01); *H04N 2201/0013* (2013.01); *H04N 2201/0094* (2013.01); *H04N 2201/3295* (2013.01)

(58) Field of Classification Search
CPC ........ H04L 12/56; H04L 12/28; G06Q 10/107
USPC .......................................... 709/206; 358/1.15
See application file for complete search history.

(56) References Cited

U.S. PATENT DOCUMENTS

| 7,024,457 | B1* | 4/2006 | Newman et al. ............. 709/206 |
| 8,259,325 | B2* | 9/2012 | Sato ............................. 358/1.15 |
| 2002/0140960 | A1* | 10/2002 | Ishikawa ..................... 358/1.13 |
| 2002/0174260 | A1* | 11/2002 | Huang ................. G06Q 10/107 |
| | | | 719/313 |
| 2003/0182378 | A1* | 9/2003 | Treptow et al. ............. 709/206 |
| 2003/0187939 | A1* | 10/2003 | O'Brien ....................... 709/206 |
| 2004/0093383 | A1* | 5/2004 | Huang ................... H04L 12/58 |
| | | | 709/206 |
| 2004/0179224 | A1* | 9/2004 | Kidokoro ..................... 358/1.14 |
| 2005/0108530 | A1* | 5/2005 | Tonegawa ..................... 713/170 |
| 2005/0168776 | A1* | 8/2005 | Yamaguchi .................. 358/1.15 |
| 2005/0273852 | A1* | 12/2005 | Ferlitsch ......................... 726/17 |
| 2006/0069918 | A1* | 3/2006 | Takahashi et al. ........... 713/176 |

(Continued)

FOREIGN PATENT DOCUMENTS

| CN | 1473416 A | 2/2004 |
| CN | 1620065 A | 5/2005 |

(Continued)

*Primary Examiner* — Razu A Miah
(74) *Attorney, Agent, or Firm* — Canon U.S.A., Inc. IP Division

(57) ABSTRACT

A data communication apparatus which does not have a function for receiving, via a mail server, e-mail sent by an external device includes a setting unit configured to set a POP account for the mail server, a reading unit configured to read a document to generate image data, a sending unit configured to send the generated image data as an e-mail via the mail server after performing authentication based on the POP account set by the setting unit, and a notification unit configured to transmit to the mail server, a delete instruction to delete an e-mail stored in a mailbox on the mail server.

14 Claims, 7 Drawing Sheets

(56) References Cited

U.S. PATENT DOCUMENTS

| | | | |
|---|---|---|---|
| 2006/0168072 A1* | 7/2006 | Park | G06Q 10/107 709/206 |
| 2007/0255734 A1* | 11/2007 | Morimoto | 707/100 |
| 2008/0127307 A1* | 5/2008 | Fukuta | 726/3 |
| 2008/0158594 A1* | 7/2008 | Kim | 358/1.15 |
| 2008/0170271 A1* | 7/2008 | Lee | G06Q 10/107 358/402 |
| 2008/0239371 A1* | 10/2008 | Sato | 358/1.15 |
| 2008/0259386 A1* | 10/2008 | Fujino | 358/1.15 |
| 2008/0273223 A1* | 11/2008 | Tsai et al. | 358/1.15 |
| 2009/0027700 A1* | 1/2009 | Kim | G06Q 10/107 358/1.6 |
| 2009/0033973 A1* | 2/2009 | Osada | 358/1.13 |
| 2009/0113011 A1* | 4/2009 | Kuribara | G06Q 10/107 709/206 |
| 2009/0144629 A1* | 6/2009 | Ferlitsch et al. | 715/736 |
| 2009/0187636 A1* | 7/2009 | Uchiyama et al. | 709/206 |
| 2009/0213426 A1* | 8/2009 | Honda | 358/1.15 |
| 2010/0008481 A1* | 1/2010 | Zakarian | G06F 21/645 379/93.03 |
| 2010/0046038 A1* | 2/2010 | Matsuda | H04N 1/00209 358/434 |
| 2010/0174794 A1* | 7/2010 | Ochi | G06Q 10/107 709/206 |
| 2010/0299737 A1* | 11/2010 | Ueno | 726/7 |
| 2011/0035454 A1* | 2/2011 | Tsuboi | G06Q 10/107 709/206 |

FOREIGN PATENT DOCUMENTS

| | | |
|---|---|---|
| CN | 1623145 A | 6/2005 |
| CN | 101552743 A | 10/2009 |
| JP | 2004-266529 A | 9/2004 |
| JP | 2007-13582 A | 1/2007 |

\* cited by examiner

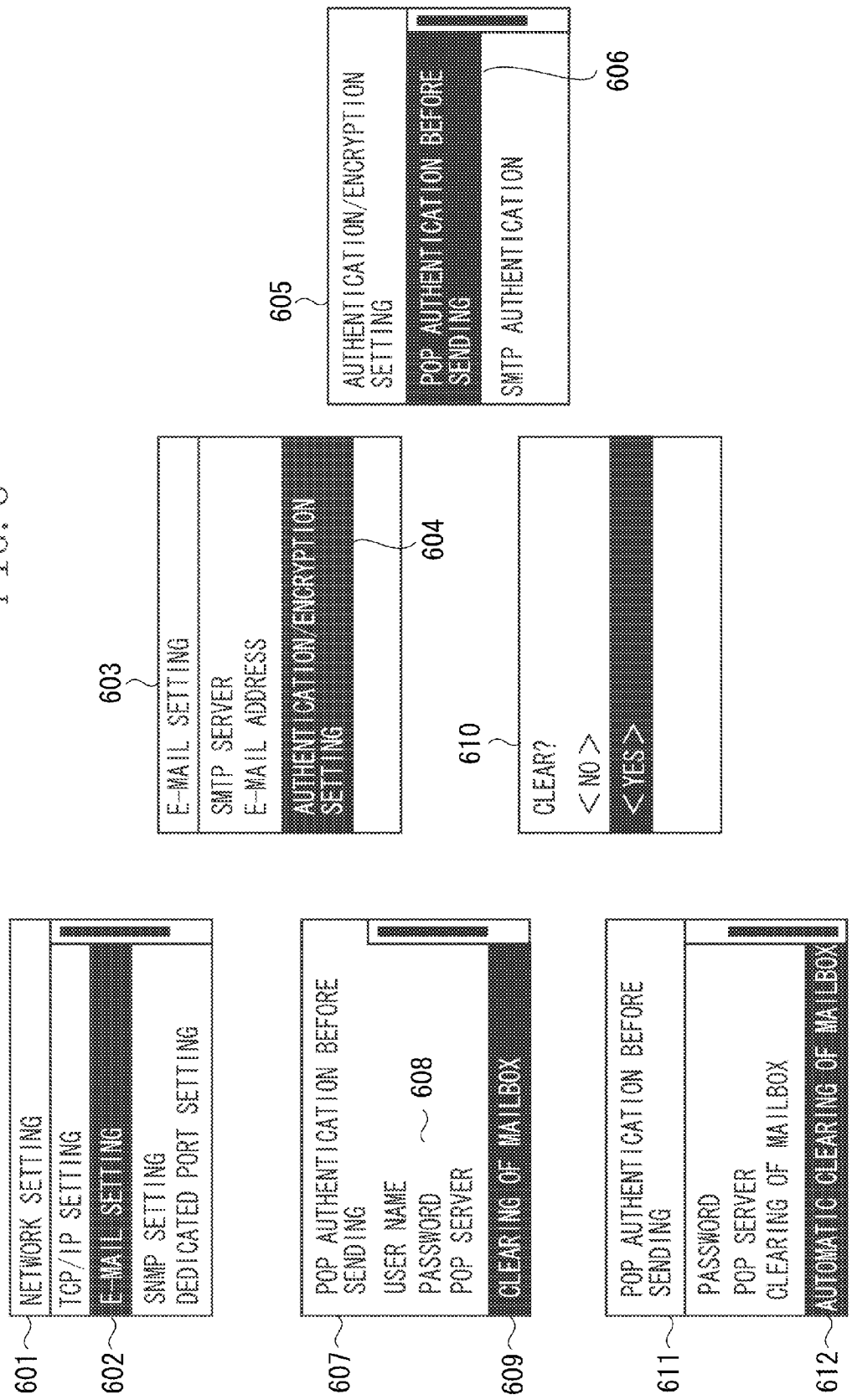

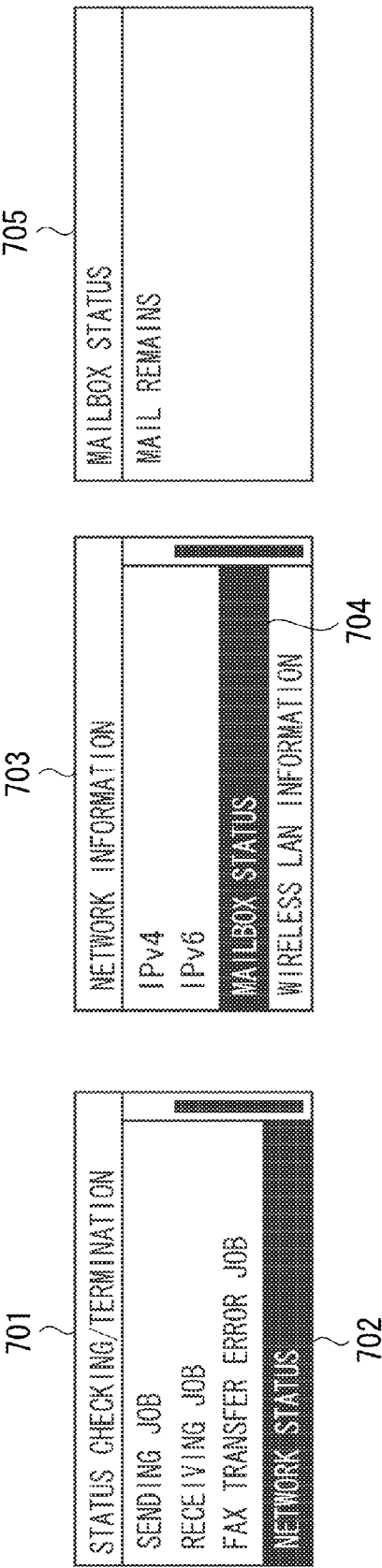

DATA COMMUNICATION APPARATUS, DATA COMMUNICATION APPARATUS CONTROL METHOD, AND PROGRAM

BACKGROUND OF THE INVENTION

Field of the Invention

The present invention relates to a data communication apparatus including a sending unit for sending e-mail via a mail server on a network, and a method for controlling the data communication apparatus, and a program.

Description of the Related Art

A multifunction peripheral (MFP) is generally known as an example of a data communication apparatus having the function of sending and receiving data, such as images, via a network as discussed in Japanese Patent Application Laid-Open No. 2007-13582. Recently, even inexpensive MFPs have the function of sending and receiving images via a network. Image sending/receiving functions can be implemented according to various protocols. Among others, a function for sending and receiving e-mail with an image (s) attached thereto is generally known. Strictly speaking, the e-mail sending/receiving function is divided into a sending function and a receiving function.

The e-mail sending function in MFPs means, for example, a function for converting an image read by the MFP into a specified file format and sending the obtained image to a mail server by using the Simple Mail Transfer Protocol (SMTP).

The e-mail receiving function in MFPs means a function for receiving image data, sent from other devices, via a mail server (a Post Office Protocol (POP) server) according to the POP protocol, and performing, for example, printing based on the received image data.

Recently, in terms of security, when e-mail is sent, authentication, called "POP before SMTP authentication", is usually performed. "POP before SMTP authentication" uses the POP protocol. More specifically, before e-mail is sent according to the SMTP protocol, a determination is made whether the sender, e.g., an MFP, has passed POP authentication. If a determination is made that the MFP has passed POP authentication, the sending of the e-mail using SMTP is allowed. If a determination is made that the MFP has not passed the POP authentication, the sending of the e-mail is restricted.

An MFP in which hardware resources are scarce may have a function restricted to e-mail sending without containing an e-mail receiving function to achieve a smaller memory and a lower cost.

From the viewpoint of security, even an MFP that does not have an e-mail receiving function may perform "POP before SMTP authentication" before sending e-mail.

For "POP before SMTP authentication", when the MFP sends e-mail, a determination is made using the POP protocol, whether POP authentication of the MFP, i.e., the sender of the e-mail, has been performed. To perform this authentication, the mail server issues a POP account to the MFP, and manages the issued POP account. The MFP needs to set the POP account issued in advance by the mail server to perform the "POP before SMTP authentication".

After issuing the POP account, the mail server typically assigns a dedicated incoming mailbox for the MFP, that is, allocates on the mail server a storage area dedicated to the MFP. However, even if the dedicated mailbox is assigned to the MFP by the issuance of the POP account, an MFP that does not have an e-mail receiving function has no means to receive e-mail in the mailbox on the mail server. The MFP that is not capable of receiving e-mail stored in the mailbox cannot check e-mail stored in the mailbox assigned to the MFP. As a result, e-mail continues to be stored in the mailbox without being accessed by the MFP, and eventually, may overflow the storage area on the mail server allocated to the MFP or may cause the management of the mailbox on the mail server to become complicated.

SUMMARY OF THE INVENTION

An aspect of the present invention is directed to a data communication apparatus which does not have the function of receiving e-mail from a mailbox on a mail server, which has a POP account issued thereto, and which includes a unit for deleting e-mail stored in a dedicated mailbox assigned on the mail server.

According to an aspect of the present invention, a data communication apparatus which does not have a function for receiving, via a mail server, e-mail sent by an external device includes a reading unit configured to read a document to generate image data, and a control unit, connected to the reading unit, configured to set a POP account for the mail server, send the generated image data via e-mail via the mail server after performing authentication based on the POP account, and transmit to the mail server a delete instruction to delete an e-mail stored in a mailbox on the mail server.

The present invention provides a function for deleting e-mail in a dedicated incoming mailbox corresponding to a POP account even if a data communication apparatus does not have an e-mail receiving function, thereby preventing an overflow of the mailbox on the mail server, enabling the mail server to operate stably.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates screens which are displayed at the time of clearing the mailbox.

FIG. 7 illustrates screens which are displayed at the time of checking the mailbox.

DESCRIPTION OF THE EMBODIMENTS

Figure 1:
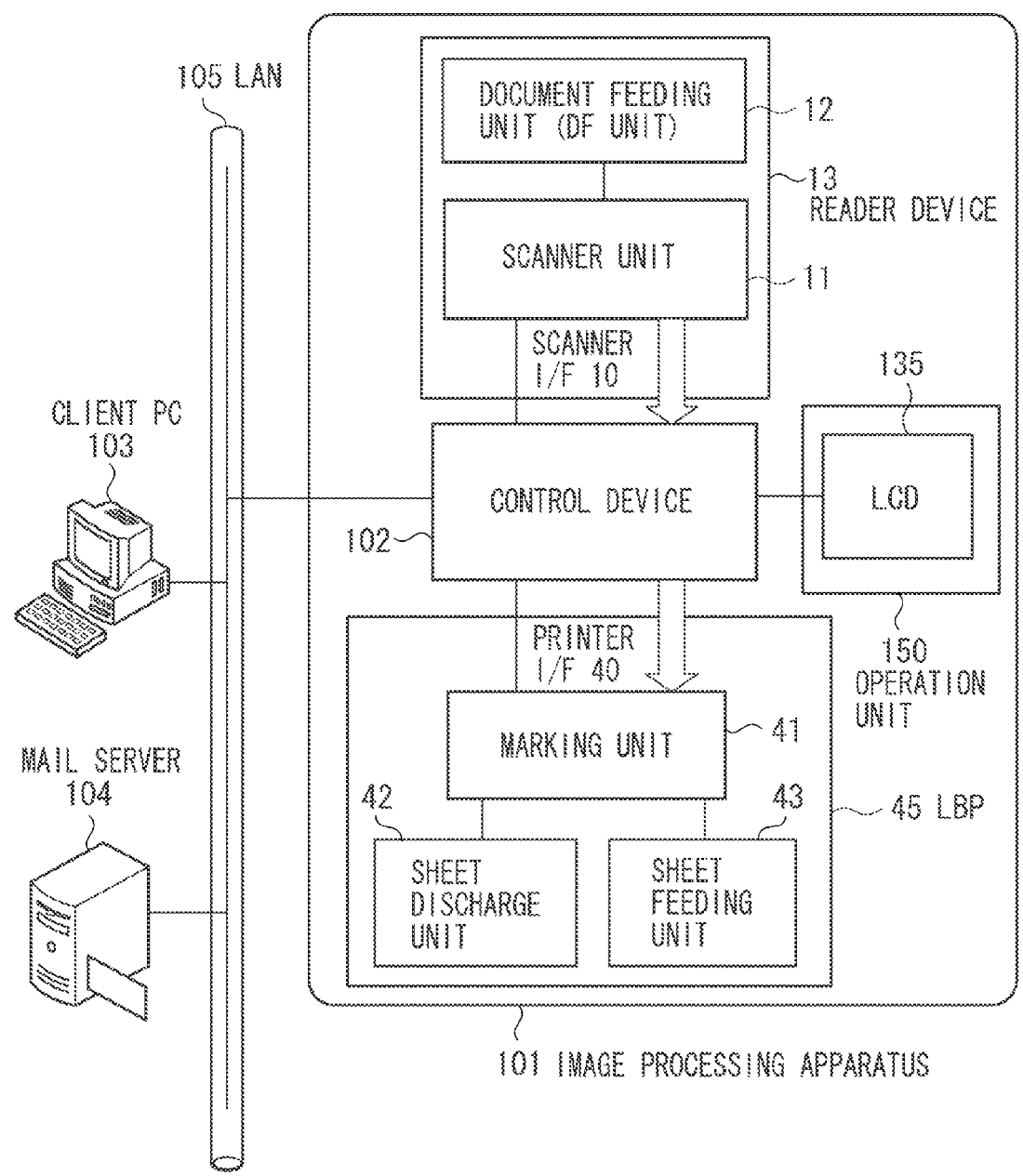
FIG. 1 illustrates the configuration of a system including an MFP, a mail server, and a client PC according to an exemplary embodiment.

Various exemplary embodiments, features, and aspects of the invention will be described in detail below with reference to the drawings.

The configuration of a system according to an exemplary embodiment will first be described with reference to FIG. 1. In the system, an MFP 101, which is an example of a data communication apparatus, a client PC 103, and a mail server 104 are interconnected via a LAN 105 so as to be able to communicate with each other.

The MFP 101 includes a reader device 13 which optically reads document images and converts the read document images to image data. The reader device 13 includes a scanner unit 11 having a function for reading documents, and a document feeding unit 12 having a function for conveying document sheets.

The MFP 101 further includes a laser beam printer (LBP) 45, which is an example of an image output device. The LBP 45 conveys recording sheets, prints image data on the recording sheets as visible images, and ejects the printed recording sheets out of the MFP 101. The LBP 45 includes a sheet feeding unit 43, a marking unit 41, and a sheet discharge unit 42. The sheet feeding unit 43 has multiple types of recording-sheet cassettes. The marking unit 41 transfers image data to recording sheets and fixes the transferred image data on the recording sheets. The sheet discharge unit 42 sorts, staples, and then ejects printed recording sheets out of the MFP 101.

The MFP 101 further includes a control device 102 which is electrically connected with the reader device 13 and the LBP 45. Furthermore, the MFP 101 is connected to external devices, such as the client PC 103 and the mail server 104 via the LAN 105. In the present exemplary embodiment, it is assumed that a mailbox is allocated on the mail server 104 for exclusive use by the MFP 101.

The control device 102 controls the reader device 13 to provide a function of reading documents, and controls the LBP 45 to provide a function of outputting image data onto recording sheets. The control device 102 also provides the function of sending image data read from the reader device 13 to an external device, such as the client PC 103, via the LAN 105. When the image data is sent in the form of e-mail, the image data passes through the mail server 104.

The operation unit 150, which is connected to the control device 102, includes a liquid crystal display (LCD) 135 and hard keys (which will be described later with reference to FIG. 3) to provide a user interface (I/F) for operating the MFP 101.

Figure 2:
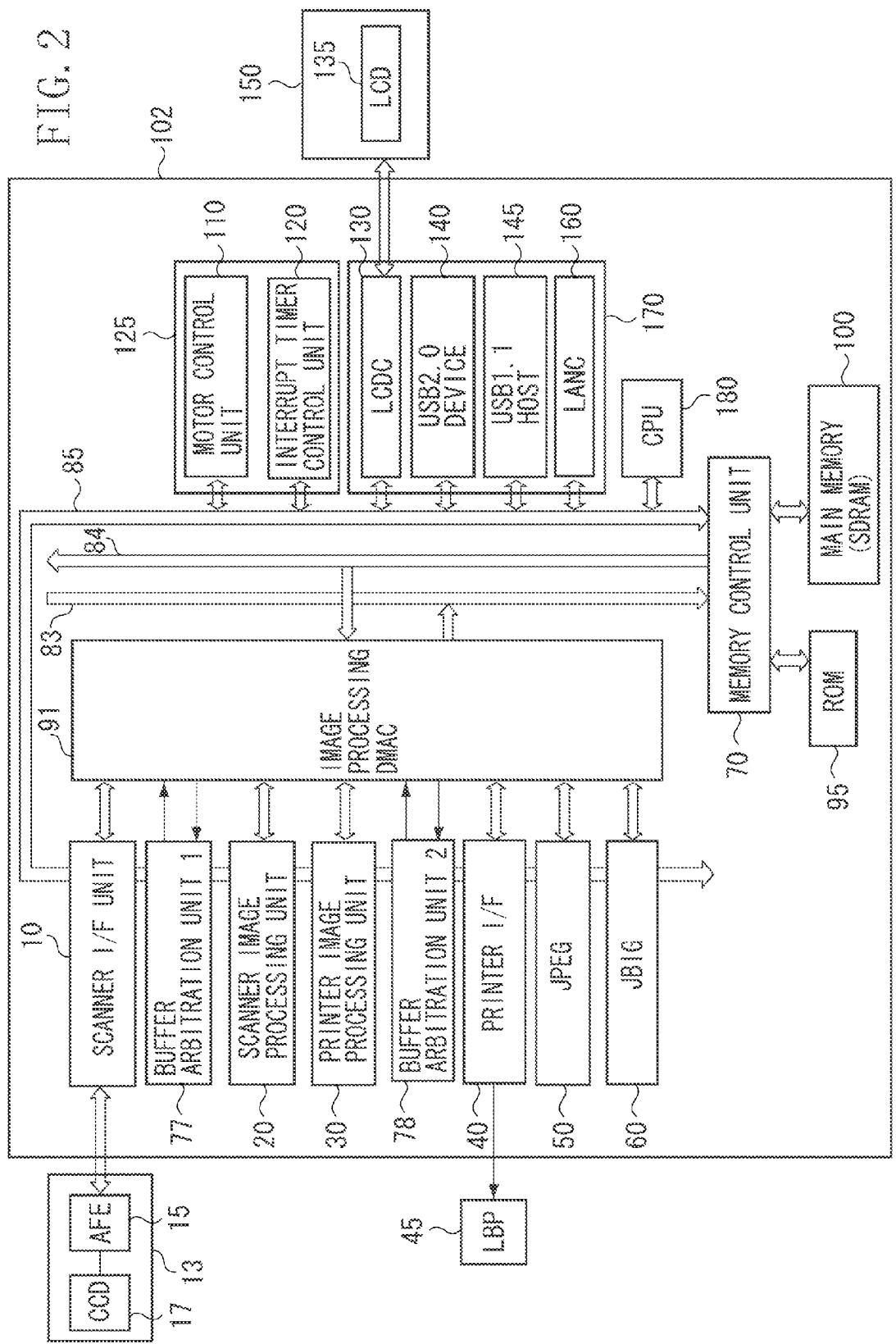
FIG. 2 illustrates the hardware configuration of the MFP.

FIG. 2 illustrates the hardware configuration of the MFP 101 in more detail. A CPU 180 controls the entire operation of the MFP 101. A scanner interface (I/F) unit 10 is connected to a charge coupled device (CCD) 17 through an analog front end (AFE) 15. The scanner I/F unit 10 performs input processing on signals that have been converted to image data by the CCD 17. The received image data is transferred by a memory control unit 70 using direct memory access (DMA), and is loaded into a main memory 100.

A scanner image processing unit 20 performs image processing corresponding to an image processing operation mode (color copy, monochrome copy, color scan, and monochrome scan, for example) on the image data loaded into the main memory 100 by the scanner I/F unit 10.

When data is transferred between the scanner I/F unit 10 and the scanner image processing unit 20 via a ring buffer area (not shown) on the main memory 100, a buffer arbitration unit 77 arbitrates the writing and reading of the data.

A printer image processing unit 30 performs area editing processing and resolution conversion processing on a received image, and outputs the obtained image data to the printer. A printer interface (I/F) 40 outputs the result of the image processing to the LBP 45 connected thereto.

When data is transferred between the printer image processing unit 30 and the printer interface 40 via the ring buffer area on the main memory 100, a buffer arbitration unit 78 arbitrates the writing and reading of the data. Although the basic configurations of the blocks of the buffer arbitration units 77 and 78 are the same, the buffer arbitration units 77 and 78 are controlled differently according to the purposes for which the buffer arbitration units 77 and 78 are used.

A Joint Photographic Experts Group (JPEG) module 50 and a Joint Bi-level Image Experts Group (JBIG) module 60 each perform compression and expansion processing on image data complying with a respective predetermined standard.

The memory control unit 70 is connected to a first bus 83 and a second bus 84 in an image processing system, and to a third bus 85 in a computer system, to perform data transfer control for the writing and reading of data to and from the main memory (synchronous dynamic random access memory (SDRAM)) 100.

A DMA controller (DMAC) 91, in cooperation with the memory control unit 70, generates and sets predetermined address information required to perform DMA control for data transferring between the image processing units (10, 20, 30, and 40) and the main memory 100. For example, according to the type of image reading device, whether the CCD 17 or a contact image sensor (CIS 18) is used, the DMAC 91 generates, for each DMA channel, address information required for DMA transfer of image data read by the scanner I/F unit 10 to the main memory 100.

The DMAC 91 also functions, together with the memory control unit 70, as a unit for providing DMA control between the image processing units (10, 20, 30, and 40) and the main memory 100. For example, the DMAC 91 performs DMA transfer of image data loaded into the main memory 100 to the scanner image processing unit 20.

A ROM 95 stores appropriate control parameters and control program data corresponding to the image reading device (the CCD 17 or the CIS 18). This enables input processing of image data according to the individual data-output format of the CCD 17 or the CIS 18, thereby eliminating the need to provide a dedicated interface circuit. The ROM 95, which can store non-volatile data, is used to store data that is desired to be retained regardless of whether the power is supplied or shut off.

The first bus 83 transmits data read from the main memory 100 to each processing unit (10 to 60) of the image processing system. The second bus 84 transmits data read from the processing units (10 to 60) of the image processing system to the main memory 100. The first and second buses 83 and 84 function in a pair to transfer image data between the image processing block and the main memory 100. The third bus 85, which is in the computer system, is connected with the CPU 180, a communication and user interface control unit 170, a mechatronics system control unit 125, control registers in the image processing units, and the DMAC 91.

The mechatronics system control unit 125 includes a motor control unit 110 and an interrupt timer control unit 120. The interrupt timer control unit 120 controls motor driving timing and timing for controlling synchronization of processing in the image processing system.

An LCD control unit 130 conducts display control for displaying, e.g., various settings and processing status of the MFP 101 on the LCD 135.

USB interface units 140 and 145 allow connections to peripheral devices. A media access control (MAC) unit 160 controls, for example, the timing of data transmission (access) to connected devices. This MAC unit 160 is also used to communicate with the other device (the client PC 103 illustrated in FIG. 1) via the LAN (105 illustrated in FIG. 1).

Control of data transmission will now be described. A sending function will be described below. The CPU 180 executes a control program, stored in the ROM 95, for achieving a protocol and a sending specification. Specifically, the CPU 180 performs processing, such as encoding an image stored in the image storage memory (the RAM 100) and adding a packet header to the image, and transmits the image to an information-processing apparatus, e.g., the client PC (103 illustrated in FIG. 1), on the network via the third bus (85 illustrated in FIG. 2) and the LANC (160 illustrated in FIG. 2) or to a specified destination via the mail server (the SMTP server) on the network.

In the present exemplary embodiment, e-mail with an image attached thereto is sent to the client PC (103 illustrated in FIG. 1) via the mail server (the SMTP server) by using the SMTP over the Transmission Control Protocol/Internet Protocol (TCP/IP).

Furthermore, in the present exemplary embodiment, when e-mail is sent via the SMTP server, authentication, called "POP before SMTP authentication" is performed before sending the e-mail to the mail server (SMTP server). "POP before SMTP authentication" is a method for authenticating a user by causing the user to access a POP server in advance prior to sending e-mail. To perform "POP before SMTP authentication", a POP account needs to be issued beforehand from the POP server. After issuing a POP account to the MFP 101 in advance, the mail server (104 illustrated in FIG. 1) assigns a mailbox to the MFP 101 for exclusive use by the MFP 101. In the present exemplary embodiment, there is a mailbox allocated for the MFP 101.

The POP account issued is used only for sending e-mail using "POP before SMTP authentication". The MFP 101 does not contain a function for receiving e-mail using the POP account issued.

As in the case of image data transmission, the CPU 180 executes an e-mail delete control program stored in the ROM 95. Specifically, the CPU 180 requests the mail server (104 illustrated in FIG. 1) on the network via the LANC (160 illustrated in FIG. 2) to delete e-mail. The CPU 180 makes the request for deletion using the Post Office Protocol (POP) over TCP/IP. For example, in the case of POPS, the CPU 180 makes a request for deletion by transmitting a DELE command to the POP server.

In the present exemplary embodiment, it is assumed that the MFP 101 does not have an e-mail receiving function, in other words, a function for receiving, via the mail server, image data transmitted by an external device, and performing printing based on the image data received via the mail server. The MFP 101, however, may have a function for receiving image data that is not routed through the mail server, for example, a function for performing printing based on a facsimile image received via a public line.

Figure 3:
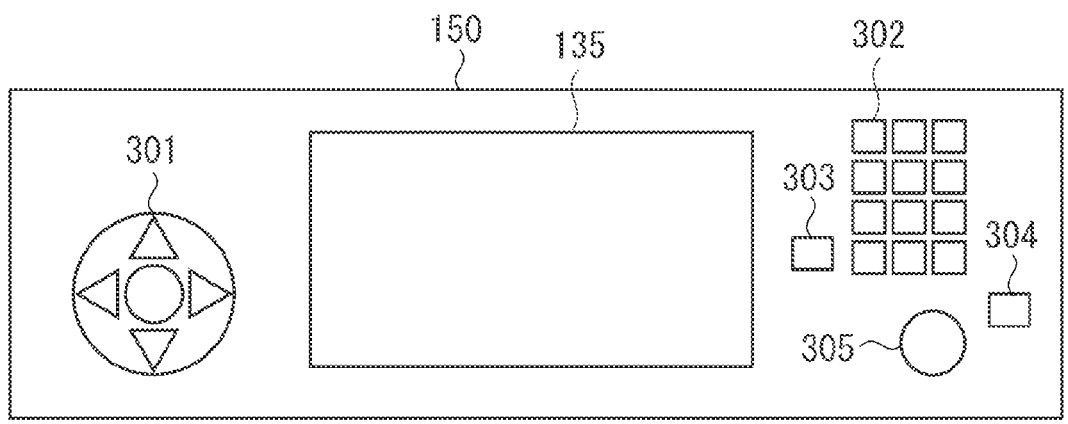
FIG. 3 illustrates an operation unit in the MFP.

FIG. 3 illustrates the configuration of the operation unit 150. The operation unit 150 includes the LCD 135, a menu selection key 301, a numeric keypad 302, a reset key 303, a stop key 304, and a start key 305. In the present exemplary embodiment, the menu selection key 301, the numeric keypad 302, the reset key 303, the stop key 304, and the start key 305 are hard keys.

The LCD 135 displays screens illustrated in FIG. 6, which will be described later, according to control input from the LCDC (130 illustrated in FIG. 2). The menu selection key 301 include a scroll key for scrolling from side to side and up and down to select an item in a menu displayed on the LCD 135, and a confirmation key for confirming the selected item. The numeric keypad 302 is used to directly input numerical values, such as a total number of copies. The reset key 303 is used to clear a setting currently being made so as to reset the setting to an initial value thereof. The start key 305 is used to give instructions to initiate various jobs. The stop key 304 is used to give instructions to stop initiated jobs.

Figure 4:
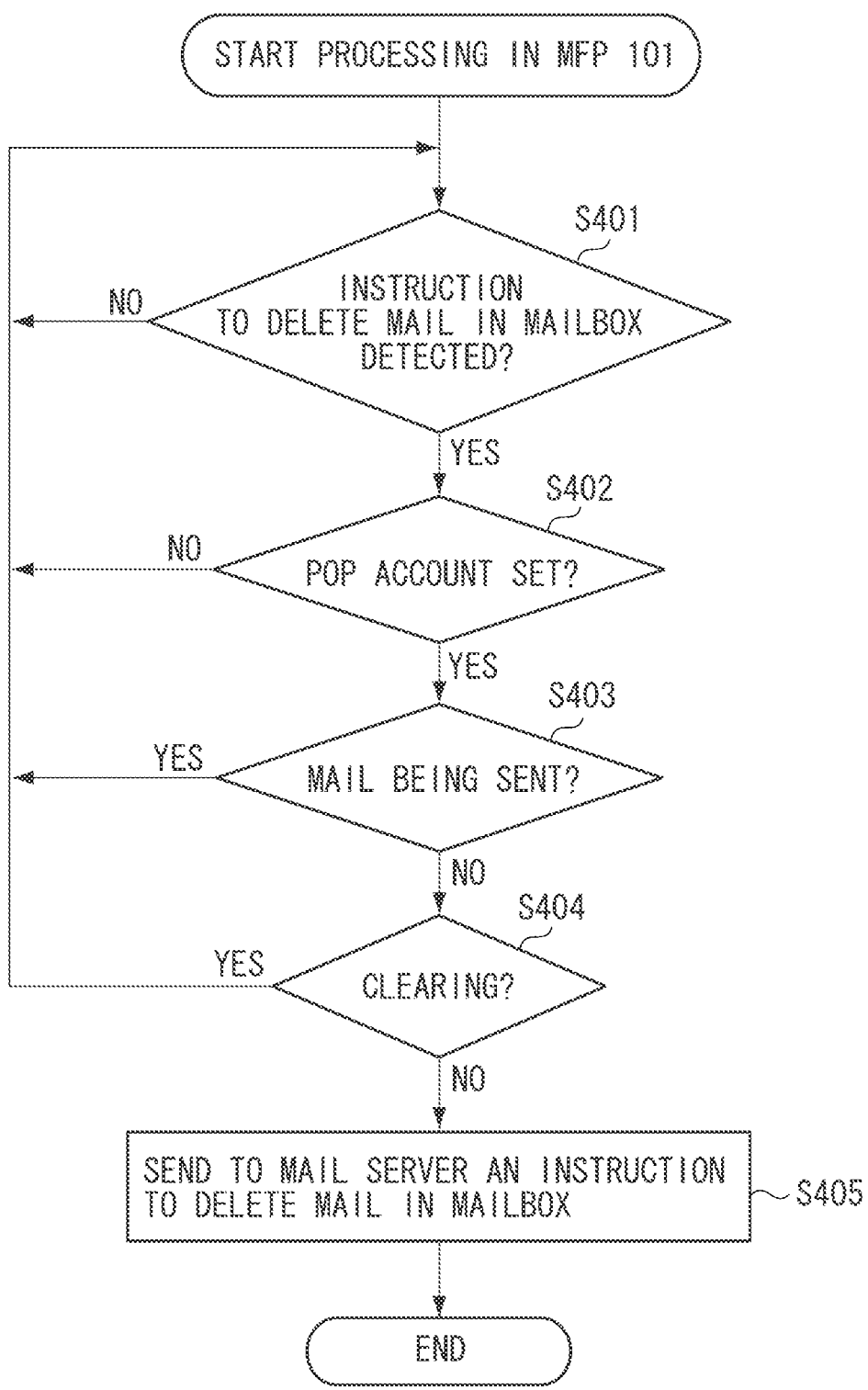
FIG. 4 is a flowchart illustrating a process performed in the MFP to delete e-mail stored in a mailbox.

FIG. 4 is a flowchart illustrating a process performed in the MFP 101 to delete e-mail stored in the mailbox on the mail server (104 illustrated in FIG. 1).

The steps in the flowchart illustrated in FIG. 4 are carried out by the CPU 180 executing the control program stored in the ROM 95 for achieving the protocol and the sending specification.

The process in the flowchart illustrated in FIG. 4 is initiated with a screen 601 of FIG. 6 displayed on the LCD 135.

In step S401, the CPU 180 detects a delete instruction to delete e-mail stored in the mailbox. To be specific, if the user selects <E-mail Setting> 602 in the screen 601 of FIG. 6 displayed on the LCD 135, the CPU 180 displays a screen 603. If the user selects <Authentication/Encryption Setting> 604 in the screen 603, the CPU 180 displays a window 605. If the user selects <POP Authentication Before Sending> 606 in the screen 605, the CPU 180 displays a screen 607. Finally, if the user selects <Clearing of Mailbox> 609 in the screen 607, the CPU 180 displays a screen 610. If the user selects <YES> in the window 610, the CPU 180 detects a delete instruction to delete e-mail stored in the mailbox. If the CPU 180 detects the delete instruction (YES in step S401), the process proceeds to step S402. If not (NO in step S401), the process checks again, in step S401, whether the CPU 180 has detected the delete instruction.

In step S402, the CPU 180 detects whether a POP account for the receiving server (POP server) in the mail server (104 illustrated in FIG. 1) has been set. The POP account for the receiving server is a user name, a password, or a domain name, for example. The POP account is stored in a non-volatile storage area (not shown). Thus, once the POP account has been set, the POP account information is retained irrespective of whether the power to the MFP (101 illustrated in FIG. 1) is supplied or shut off.

Settings of the receiving server are made on the screen 607 illustrated in FIG. 6. If, in step S402, the CPU 180 detects that the POP account for the mail server has been set (YES in step S402), the process proceeds to step S403. If the POP account has not been set (NO in step S402), the process returns to step S401 because the mailbox on the receiving server cannot be accessed.

In step S403, the CPU 180 checks whether the MFP (101 illustrated in FIG. 1) is currently sending e-mail. If the MFP 101 is not sending e-mail (NO in step S403), the process proceeds to step S404. If the MFP 101 is sending e-mail (YES in step S403), the process returns to step S401 because e-mail in the mailbox cannot be deleted at this point in time.

However, step S404 may not be needed depending on the hardware configuration of the control device (102 illustrated in FIG. 1) and the control program stored in the ROM 95 illustrated in FIG. 2. Specifically, if control that allows sending of e-mail and deletion of e-mail to be performed concurrently can be exercised, step S403 is not necessary. In the present exemplary embodiment, deletion of e-mail in the mailbox is accomplished as a result of the process in which the CPU 180 displays the screens 601 to 610 illustrated in FIG. 6 on the LCD 135 and detects pressing of hard keys by the user. Therefore, an instruction to send e-mail cannot be given at the same time, and the process always goes to step S404.

In step S404, the CPU 180 makes an inquiry to the mail server (104 illustrated in FIG. 1) as to whether the mailbox is currently being cleared. If the mailbox is currently being cleared (YES in step S404), the process returns to step S401 because clearing of the mailbox is unnecessary. If the mailbox is not currently being cleared (NO in step S404), the process proceeds to step S405.

In step S405, the CPU 180 sends to the mail server (104 illustrated in FIG. 1) a delete instruction indicating deletion of e-mail in the mailbox. Specifically, the CPU 180 sends the delete instruction according to the following procedure.

First, the CPU 180 sends a LIST command defined by the POP3 standard to the mail server. In response to the sent LIST command, the mail server 104 sends, back to the MFP 101, information on a list of e-mail stored in the mailbox allocated to the MFP 101, i.e., the sender. According to the e-mail list information received as a response, the MFP 101 transmits to the mail server a DELE command with an e-mail message number(s) designated. In the present exemplary embodiment, when sending the DELE command, the MFP 101 designates all e-mail messages described in the obtained list information.

As a result of sending (i.e., notification) the DELE command to the mail server 104 in step S405, the mail server 104 deletes the e-mail messages stored in the mailbox according to the DELE command. It is assumed that the e-mail messages to be deleted include, for example, response mail and error mail returned to the MFP 101 in response to e-mail messages sent by the MFP 101 via the LANC (160 illustrated in FIG. 2).

In the present exemplary embodiment, the delete instruction to delete e-mail stored in the mailbox is given in response to the receipt, by the operation unit 150 in the MFP 101, of an instruction from the user. However, if the control program stored in the ROM 95 illustrated in FIG. 2 is capable of receiving instructions from remote locations, a delete request can also be made from a remote information-processing apparatus.

Moreover, instead of giving an instruction directly, the user may indirectly give an instruction to automatically delete mail stored in the mailbox.

For example, if the user selects <Automatic Clearing of Mailbox> 612 in the screen 611 in advance, the setting for automatically deleting e-mail in the mailbox is established. This enables the CPU 180 to automatically receive a delete instruction in step S401 without detecting pressing of a hard key by the user. The timing of the automatic receipt of a delete instruction may be, but is not limited to, any of the following:

At the time when the MFP 101 is activated;
At the time when a predetermined amount of time has elapsed since the last e-mail deletion process;
At the time when transmission of image data is initiated; and
At the time when transmission of image data is complete.

Accordingly, in the present exemplary embodiment, the MFP 101 that has the function of attaching an image(s) to e-mail and sending the e-mail, but does not have the function of receiving e-mail and processing images, can send e-mail using "POP before SMTP authentication".

Furthermore, in the present exemplary embodiment, the MFP 101 can delete response mail and error mail stored (or may be stored) in the mailbox as responses to e-mail that has been sent using "POP before SMTP authentication". This prevents a situation in which e-mail stored in the mailbox on the mail server can no longer be held in the storage area in the mailbox, causing the mail server to operate unstably.

Furthermore, in the present exemplary embodiment, a situation in which unnecessary e-mail continues to be stored on the mail server can be avoided.

Figure 5:
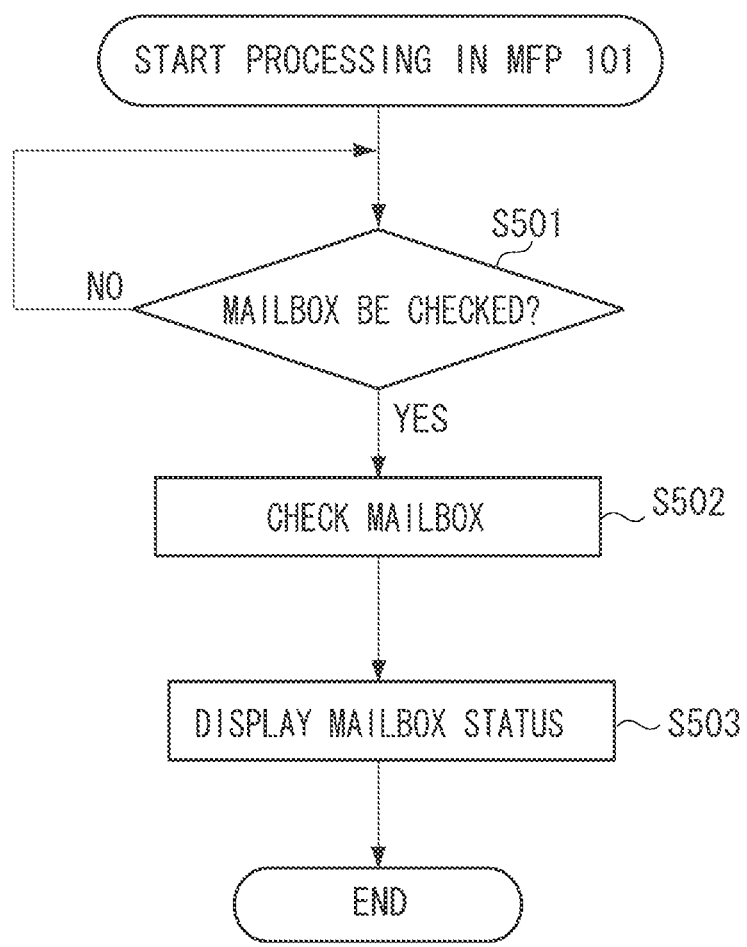
FIG. 5 is a flowchart illustrating a process performed in the MFP to check e-mail stored in the mailbox.

FIG. 5 is a flowchart illustrating a process for checking whether e-mail is present in the mailbox. The steps in the flowchart illustrated in FIG. 5 are carried out by the CPU 180 executing the control program stored in the ROM 95.

The process in the flowchart illustrated in FIG. 5 is initiated with a screen 701 of FIG. 7 displayed on the operation unit 150 in the MFP 101.

In step S501, the CPU 180 detects pressing of a hard key that means an instruction to check the mailbox. In this step, if the CPU 180 detects pressing of <Network Status> 702 in the screen 701 of FIG. 7 displayed on the LCD 135, the CPU 180 displays a screen 703. Then, if the user presses <Mailbox Status> 704 in the screen 703, the CPU 180 detects an instruction to check e-mail stored in the mailbox. If the CPU 180 detects the check instruction (YES in step S501), the process proceeds to step S502. If not (NO in step S501), the process checks again, in step S501, whether the CPU 180 has detected the check instruction.

In step S502, the CPU 180 checks with the mail server (104 illustrated in FIG. 1) whether e-mail is present in the mailbox. The CPU 180 performs this checking by sending a LIST command specified by the POP standard to the mail server. If the CPU 180 receives information on a list of one or more e-mail messages as a response to the LIST command sent, the CPU 180 determines that e-mail is present in the mailbox. As described in step S402, prior to the process in step S502, the CPU 180 may detect whether a POP account for the receiving server has been set in advance.

In step S503, the CPU 180 displays the presence or absence of e-mail on the LCD 135. A screen 705 illustrated in FIG. 7 is an example of such a display screen. This example screen 705 provides notification that there is e-mail in the mail server (104 illustrated in FIG. 1). The user can use this notification as a criterion to make a determination whether to clear the mailbox.

In the present exemplary embodiment, the check instruction to check e-mail stored in the mailbox is given in response to the receipt, by the operation unit 150 in the MFP 101, of an instruction from the user. However, if the control program stored in the ROM 95 illustrated in FIG. 2 is capable of receiving instructions from remote locations, a check request can also be made from a remote information-processing apparatus.

In addition, instead of giving an instruction directly, the user may indirectly give an instruction to automatically check e-mail stored in the mailbox.

In the present exemplary embodiment, as a result of the checking process illustrated in FIG. 5, the screen 705 indicating whether e-mail remains in the mailbox is displayed on the LCD 135. However, while the screen 705 is displayed on the LCD 135, the CPU 180 may check whether there is e-mail in step S502, and upon determination that e-mail remains, an instruction to delete the e-mail may be issued.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-285155 filed Dec. 21, 2010, which is hereby incorporated by reference herein in its entirety.

What is claimed is:

1. An image processing apparatus comprising:
   a scanner unit configured to scan an image;
   a setting unit configured to set a Post Office Protocol (POP) account issued to the image processing apparatus by a POP server, wherein after issuing the POP account to the image processing apparatus, the POP server assigns a mailbox for incoming email to the image processing apparatus;
   a sending unit configured to send an e-mail, to which the image scanned by the scanner unit is attached, to a destination in accordance with Simple Mail Transfer Protocol (SMTP);
   an authentication unit configured to perform POP authentication using the POP account before sending the e-mail in accordance with the SMTP;
   a reception unit configured to receive a delete instruction from a user; and
   a deletion request unit configured to request, based on the reception of the delete instruction, the POP server to delete e-mails stored in the mailbox assigned to the image processing apparatus, the mailbox being included in the POP server and corresponding to the POP account, without receiving the e-mails stored in the mailbox from the POP server,
   wherein the image processing apparatus has an e-mail transmitting function but does not have an e-mail receiving function.

2. The image processing apparatus according to claim 1, wherein the e-mails deleted according to the delete instruction include at least response mail returned in response to the e-mail sent by the sending unit.

3. The image processing apparatus according to claim 1, wherein the request for deleting the e-mails in the mailbox is not made in a case where the delete instruction is received and where the POP account is not set.

4. The image processing apparatus according to claim 1, wherein the request for deleting the e-mails in the mailbox is not made in a case where the delete instruction is received by the receiving unit and where the e-mail is now being transmitted by the sending unit.

5. The image processing apparatus according to claim 1, further comprising: a display unit that displays a screen image for notification of e-mail presence or e-mail absence in the mailbox.

6. The image processing apparatus according to claim 1, wherein the POP account includes a user name, a password, and a domain name.

7. The image processing apparatus according to claim 1, further comprising: a second setting unit that sets automatic clearing of the mailbox.

8. The image processing apparatus according to claim 7, wherein in a case where the automatic clearing is set by the second setting unit, the deletion request unit requests the POP server to delete the e-mails stored in the mailbox when the image processing apparatus is activated.

9. The image processing apparatus according to claim 7, wherein in a case where the automatic clearing is set by the second setting unit, the deletion request unit requests the POP server to delete the e-mails stored in the mailbox after lapse of predetermined time since the POP server was requested to delete the e-mails stored in the mailbox.

10. The image processing apparatus according to claim 7, wherein in a case where the automatic clearing is set by the second setting unit, the deletion request unit requests the POP server to delete the e-mails stored in the mailbox when transmission of the e-mail is initiated or completed.

11. The image processing apparatus according to claim 1, wherein the delete instruction is received by an operation unit of the image processing apparatus.

12. The image processing apparatus according to claim 1, wherein the delete instruction is made from a remote information processing apparatus.

13. A method for controlling an image processing apparatus, the method comprising:
   setting a Post Office Protocol (POP) account issued to the image processing apparatus by a POP server, wherein after issuing the POP account to the image processing apparatus, the POP server assigns a mailbox for incoming email to the image processing apparatus;
   sending an e-mail, to which an image is attached, to a destination in accordance with Simple Mail Transfer protocol (SMTP);
   performing POP authentication using the POP account before sending the e-mail in accordance with the SMTP;
   receiving a delete instruction from a user; and
   requesting, based on the reception of the delete instruction, the POP server to delete e-mails stored in the mailbox assigned to the image processing apparatus, the mailbox being included in the POP server and corresponding to the POP account, without receiving the e-mails stored in the mailbox from the POP server,
   wherein the image processing apparatus has an e-mail transmitting function but does not have an e-mail receiving function.

14. A non-transitory computer-readable storage medium storing a program configured to cause a computer to execute a method for controlling an image processing apparatus, the method comprising:
   setting a Post Office Protocol (POP) account issued to the image processing apparatus by a POP server, wherein after issuing the POP account to the image processing apparatus, the POP server assigns a mailbox for incoming email to the image processing apparatus;
   sending an e-mail, to which an image is attached, to a destination in accordance with Simple Mail Transfer Protocol (SMTP);
   performing POP authentication using the POP account before sending the e-mail in accordance with the SMTP;
   receiving a delete instruction from a user; and
   requesting, based on the reception of the delete instruction, the POP server to delete e-mails stored in the mailbox assigned to the image processing apparatus, the mailbox being included in the POP server and corresponding to the POP account, without receiving the e-mails stored in the mailbox from the POP server, wherein the image processing apparatus has an e-mail transmitting function but does not have an e-mail receiving function.

\* \* \* \* \*